(12) United States Patent
Newton et al.

(10) Patent No.: US 8,711,203 B2
(45) Date of Patent: Apr. 29, 2014

(54) CREATING THREE DIMENSIONAL GRAPHICS DATA

(75) Inventors: Philip Steven Newton, Eindhoven (NL); Hong Li, Eindhoven (NL); Darwin He, Shangai (CN)

(73) Assignee: Koninklijke Philips N.V., Eindhoven (NL)

( * ) Notice: Subject to any disclaimer, the term of this patent is extended or adjusted under 35 U.S.C. 154(b) by 895 days.

(21) Appl. No.: 12/444,704

(22) PCT Filed: Oct. 8, 2007

(86) PCT No.: PCT/IB2007/054084
§ 371 (c)(1),
(2), (4) Date: Apr. 8, 2009

(87) PCT Pub. No.: WO2008/044191
PCT Pub. Date: Apr. 17, 2008

(65) Prior Publication Data
US 2010/0118119 A1    May 13, 2010

(30) Foreign Application Priority Data

Oct. 11, 2006    (EP) .................................... 06301037

(51) Int. Cl.
*H04N 13/00* (2006.01)
(52) U.S. Cl.
USPC ................ 348/42; 352/86; 359/462; 396/324
(58) Field of Classification Search
USPC .......................................................... 348/42
See application file for complete search history.

(56) References Cited

U.S. PATENT DOCUMENTS

| 6,882,346 B1 * | 4/2005 | Lefebvre et al. .............. 345/506 |
| 2005/0185711 A1 * | 8/2005 | Pfister et al. ............. 375/240.01 |
| 2007/0057969 A1 * | 3/2007 | McCrossan et al. .......... 345/629 |

FOREIGN PATENT DOCUMENTS

| EP | 0600601 B1 | 1/1999 | |
| JP | 2000078611 A | 3/2000 | |
| JP | 2004274125 A | 9/2004 | |
| WO | 0046753 A1 | 8/2000 | |
| WO | 2005006747 A1 | 1/2005 | |
| WO | WO 2005114998 A1 * | 12/2005 | ............... H04N 7/08 |

OTHER PUBLICATIONS

"Preliminary Requriements for 3D Video Support in MPEG", 59. MPEG Meetings Mar. 1, 2002-Mar. 15, 2002; Jeju; (Motion Picture Expert Group or ISO/IEC JTC1/SC29/WG11), No. N4679, Apr. 22, 2002.
"Application Definition Blu-Ray Disc Format BD-J Baseline Application and Logical Model Definition for BD-ROM", XP007904998, Mar. 1, 2005, pp. 1-45.
'Schreer et al, "3D Videocommunication: Algorithms, Concepts and Real-Time Systems in Human Centered Communication", Chapter 2, C Fehn, Jul. 2005, 17 Pages.

* cited by examiner

*Primary Examiner* — Jude Jean Gilles
*Assistant Examiner* — Jaren M Means

(57) ABSTRACT

The present invention relates to a method in a graphics system for creating a graphics stream allowing to form a three-dimensional graphics data, the graphics stream consisting of segments. The graphics stream is divided into at least a first segment and a second segment, the first segment comprises two-dimensional graphics data and the second segment comprises a depth map for the two-dimensional graphics data. The graphics stream can be decoded by a decoder to form two data sequences to be output separately to a display device for rendering a three-dimensional subtitle or graphics image for a three-dimensional video image.

21 Claims, 6 Drawing Sheets

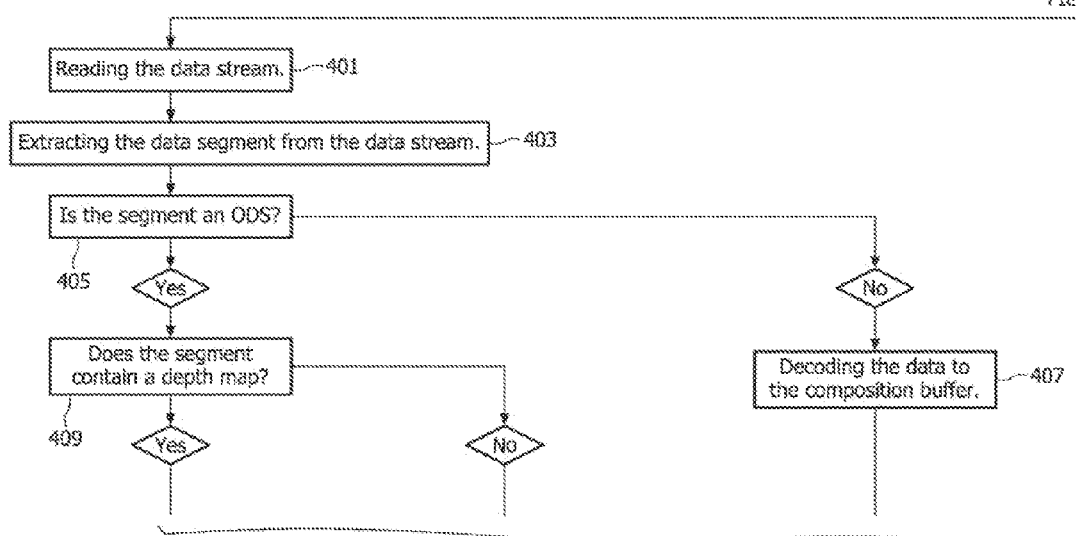

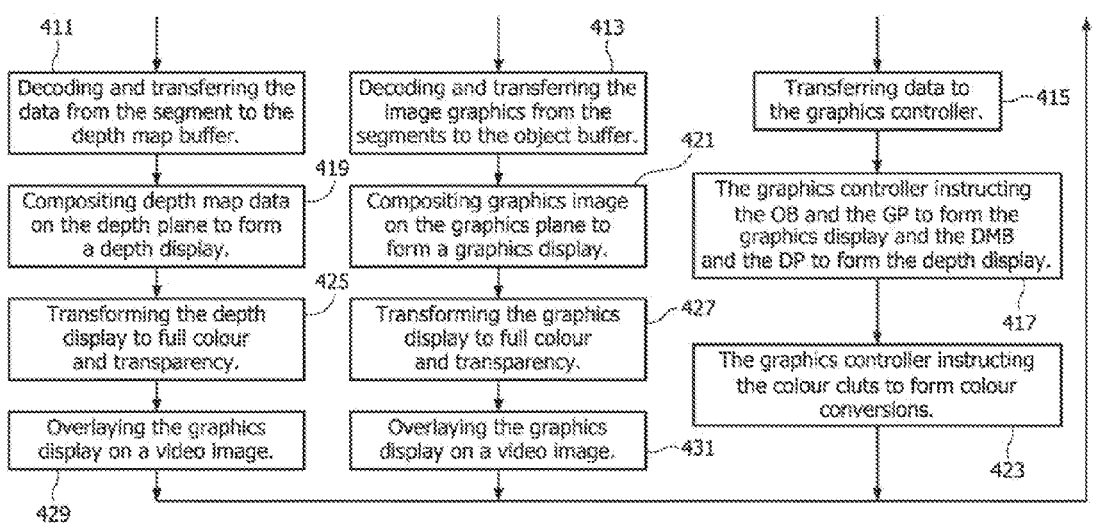
FIG. 4-II

CREATING THREE DIMENSIONAL GRAPHICS DATA

TECHNICAL FIELD

The present invention relates to a method for creating a data stream, which can be decoded by a decoder to form a three-dimensional graphics stream that can be displayed on a screen of a display. The invention also relates to a corresponding decoding method, decoder, computer program product, recording media, set-top box, digital video disc (DVD) player and digital television.

BACKGROUND OF THE INVENTION

Graphical display devices, such as computer displays or televisions are commonly used for displaying two or three-dimensional objects to a user of the device. Typically an audio/visual (AV) clip to be displayed to the user consists of a video stream, at least one audio stream and a graphics stream. The video stream corresponds to a moving picture of a film, the audio stream corresponds to the audio of the film and the graphics stream typically corresponds to subtitles or menu data of the film.

The introduction of three-dimensional (3D) video creates new opportunities for creative content creators, for instance in the area of movie publishing. 3D video is experiencing a revival with the introduction of new autostereoscopic displays and improvement of existing techniques, such as monitors with high refresh rates.

The Blu-ray Disc (BD) is a disc format meant for high-density storage of high-definition (HD) video and data. The Blu-ray standard was jointly developed by a group of consumer electronics and personal computer (PC) companies called the Blu-ray Disc Association (BDA).

FIG. 1 shows the principal elements of a graphics system, which in this case operates in accordance with the Blu-ray standard. In FIG. 1 there is shown a BD 101, which in this description shall be referred to as a BD-ROM 101. The BD-ROM 101 is adapted for storing data, such as 3D video clips. Then there is shown a BD player 103 also known as a playback unit, which is capable of decoding data from the BD-ROM 101. The BD player 103 supports at least one of the following audio and video codecs: MPEG-2, MPEG-4 and H.264/AVC. The BD player 103 may also be arranged to record data onto the BD-ROM 101. The player 103 is connected to a display unit 105 comprising a screen. The display unit 105 in this case is a television 105.

FIG. 2 shows one example of a block diagram of a graphics decoder 200, which can be used to decode 2D or 3D graphics data streams. In this example the decoder 200 is physically located in the BD player 103.

The data stream that consists of data segments first arrives at a coded data buffer 201. The data stream comprises the following functional segment types: a presentation composition segment (PCS), a window definition segment (WDS), a palette definition segment (PDS), an object definition segment (ODS) and an end of display segment (END).

The ODS is a functional segment for defining a graphics object. The graphics object is located in a field called object_data_fragment. The ODS also comprises other fields, for instance an object_ID field used for identifying the graphics object.

The PDS is a functional segment for defining a palette used for colour conversion. The PDS comprises data showing pixel values and combinations of pixel codes of 1 to 255. A pixel value referred to here is made up of a transparency (T value), a red colour difference component (Cr value), a blue colour difference component (Cb value) and a luminance component (Y value).

The WDS is a functional segment for defining an area on the graphics plane. The meaning of the graphics plane will be explained later. A rectangular area on the graphics plane is called a window, which is defined by the WDS.

The END is a functional segment indicating that the transmission of the data sequence is complete, i.e. that all segments relating to a display set have been decoded.

The PCS is a functional segment for composing a screen that can be synchronised with a moving image. The PCS also defines the appearance of a graphics display on the graphics plane.

The number of different segment types in the data stream may vary depending on the transmitted graphics object. For instance, there can be several ODS, but only one PCS. The different segments types are linked together by using different identifiers, such as an object identity, a window identity or a palette identity, in the segments. One graphics stream further forms a display set. International patent publication WO2005/006747, for instance, discloses more details on these functional segments.

A graphics processor 203 extracts the data segments from the coded data buffer at time instants defined by system timestamps associated with the data segments to create a data sequence. When the PCSs, PDSs and WDSs arrive at the graphics processor, they are decoded to a composition buffer 205. When the ODSs arrive at the graphics processor 203, the graphics processor decodes the ODSs to obtain uncompressed graphics having index colours, and transfers the uncompressed graphics to an object buffer 207.

A graphics controller 209 is responsible for compositing graphics images onto the graphics plane 211 in accordance with the description in the PCS. The graphics controller also provides, based on the data fields in the PCS, information related to cropping graphics objects that are in the object buffer 207. Thus, the functional segments are decoded and a graphics object is composited onto the graphics plane 211 inside a bounding area called a window.

A colour clut block 213 performs a colour conversion on the uncompressed graphics obtained from the object buffer 207 based on information obtained from the graphics controller 209. For this purpose the graphics controller 209 is also connected to the colour clut block 213.

The graphics stream is then output to a display 105.

However, introducing 3D video and 3D graphics into such graphics systems usually requires changes to MPEG standards for the video and also changes in the graphics system. This is the case, for instance for including 3D graphics in Blu-ray graphics system. Such changes are cumbersome.

Therefore, it is desirable to find a simple solution to include 3D graphics into the existing graphics systems without the need to change the existing system specifications.

SUMMARY OF THE INVENTION

The invention aims at achieving the above object.

According to a first aspect of the invention there is proposed a method in a graphics system for creating a data stream allowing to form three-dimensional graphics data, the data stream consisting of segments. The method comprises:

forming the data stream comprising at least first and second segments, the first segment comprising a two-dimensional graphics object and the second segment comprising information so related to the two-dimensional graphics object that it allows to obtain the three-dimensional graphics data by combining at least first and second data sequences, obtained by a decoder from the first and second segments, respectively.

One advantage of an embodiment of the present invention is that 3D graphics data can be added to a graphics system without changing the system standard.

According to a second aspect of the invention there is provided a method in a graphics system for decoding a data stream, wherein the data stream comprises at least first and second segments, the first segment comprising two-dimensional graphics data and the second segment comprising information relating to the two-dimensional graphics object, the method comprising:

receiving the data stream;
forming a first decoded data sequence from the first segment and a second decoded data sequence from the second segment; and
outputting the first decoded data sequence and the second decoded data sequence to a display unit for rendering a three-dimensional graphics data by combining the first decoded data sequence and the second decoded data sequence.

According to a third aspect of the invention there is provided a computer program product comprising instructions for implementing the method according the first and second aspects of the invention when loaded and run on computer means of the graphics system.

According to a fourth aspect of the invention there is provided a recording media having instructions stored therein for implementing the steps of a method according to the first and second aspects of the invention when loaded and run on computer means of the recording media.

According to a fifth aspect of the invention there is provided a decoder for decoding a data stream, wherein the data stream comprises at least first and second segments, the first segment comprising two-dimensional graphics object and the second segment comprising information related to the two-dimensional graphics object, the decoder comprising:

a receiver for receiving the data stream;
a processor for forming a first decoded data sequence from the first segment and means for forming a second decoded data sequence from the second segment; and
means for outputting the first decoded data sequence and the second decoded data sequence to a display unit for rendering a three-dimensional graphics data by combining the first decoded data sequence and the second decoded data sequence.

Another advantage in accordance with an embodiment of the invention is that the provided decoder is arranged to decode both the graphics object and information relating to the graphics object by using only one processor.

According to a sixth aspect of the invention there is provided a set-top box comprising the decoder in accordance with the fifth aspect of the invention.

According to a seventh aspect of the invention there is provided a DVD player comprising the decoder in accordance with the fifth aspect of the invention.

According to an eighth aspect of the invention there is provided a digital television comprising the decoder in accordance with the fifth aspect of the invention.

BRIEF DESCRIPTION OF THE DRAWINGS

Other features and advantages of the invention will become apparent from the following description of non-limiting exemplary embodiments, with reference to the appended drawings, in which:

FIG. 4 is a flow chart depicting a method of decoding the data stream in accordance with an embodiment of the invention;

DETAILED DESCRIPTION OF EMBODIMENTS OF THE INVENTION

In the following description some non-limiting embodiments of the invention will be described in more detail in the context of Blu-ray graphics system with reference to the appended figures. However, it is to be noted that the invention is not restricted to this environment, but the teachings of the invention are equally applicable in other types of graphics systems as well.

In accordance with an embodiment of the invention a data stream is created that contains in this example two ODSs, one PCS, one WDS, one PDS and one END segment. In this case the data stream is created by the BD player 103. Now the first ODS contains in its object_data_fragment field a 2D graphics object and the second ODS contains in its object_data_fragment field a depth map for the 2D graphics object. It is to be noted that instead of the depth map, the second segment could equally contain audio information or other interactive information for the 2D graphics object. Also the order of these two ODSs is no limited and the first ODS could also contain the depth map and the second ODS could contain the graphics object. The PCS, WDS and PDS contain information for further defining the data contained in the ODSs. The END segment is used to indicate that the transmission of a display set is complete. The data stream consists of segments and the segments further form display sets. The END segment does not contain any segment data and it is not stored in any buffer of the decoder after the contents of the END has been decoded. The created graphics stream is then stored on the BD-ROM 101.

It is to be noted that the data stream may contain more than two ODSs and in that case for each ODS containing the 2D graphics object, there would be the corresponding ODS containing the depth map information. The number of ODSs in the data stream may not be dependent on the number of PCSs or WDSs.

In this example the data stream comprises a graphics object that can be overlaid as a subtitle on the associated video image. The data stream is thus a presentation graphics stream of a high definition movie (HDMV) mode of the Blu-ray standard. The HDMV mode also provides interactive graphics stream that contains information required to provide a series of interactive displays, which appear and disappear with frame accuracy, that are supplemental to an associated HDMV presentation. In the decoder, separate graphics planes are required for the objects of the presentation graphics stream and the objects of the interactive graphics stream. The graphics image is composited on to the graphics plane to form a graphics display before overlaying the graphics display on the associated video image. This procedure will be explained later in more detail.

Next the operation of the decoder is described with reference to the block diagrams of FIGS. 3 and 5 and the flow chart of FIG. 4.

Figure 3:
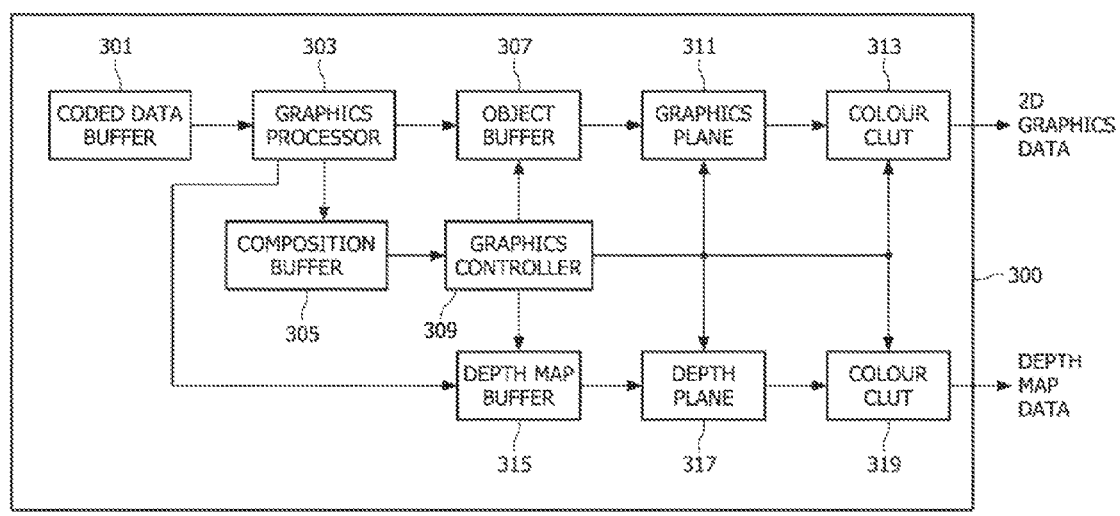
FIG. 3 is a block diagram of a decoder in accordance with an embodiment of the invention arranged to decode a data stream.

FIG. 3 illustrates a graphics decoder 300 in accordance with an embodiment of the invention, which is arranged to decode the information stored on the BD-ROM 101. The decoder 300 is physically located in the BD player 103.

Figure 1:
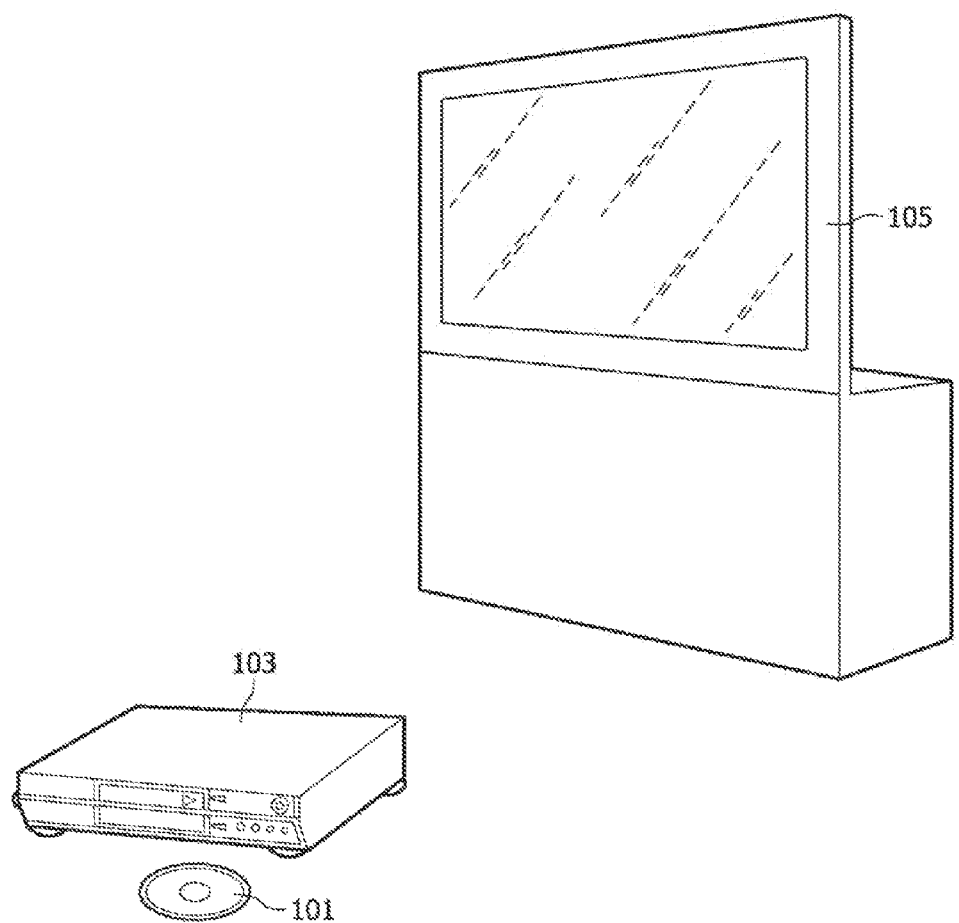
FIG. 1 shows an environment in which the embodiments of the invention may exist.
Figure 2:
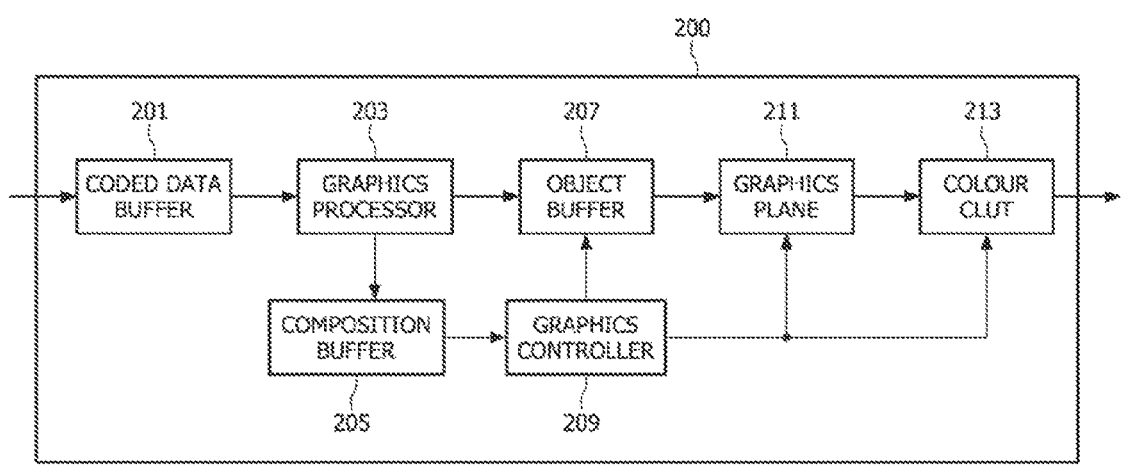
FIG. 2 is a block diagram of a decoder arranged to decode a graphics stream.

A coded data buffer 301, a composition buffer 305, an object buffer 307, a graphics plane 311 and a colour clut block 313 operate as the corresponding blocks of FIG. 2. However, the operation of a graphics processor 303 and a graphics controller 309 is different than in the solution of FIG. 2. There is also shown a depth plane 317 and a second colour clut block 319 which do not exist in the decoder of FIG. 2. The decoder 300 can be used to decode 2D or 3D data stream. In this case the decoder 103 is physically located in the BD player 103.

First in step 401 the information stored on the BD-ROM 101 is read into the coded data buffer 301. The data stream that arrives in the coded data buffer 301 consists of the following functional segments as described earlier: one PCS, one WDS, one PDS, two ODSs and one END. The order of the data segments in the data stream is not limited as long as the END segment is the last segment of the stream. Then the graphics processor 303 extracts, in step 403, the data segments from the coded data buffer 301 at the times defined by system time-stamps associated with the data segments. Next the graphics processor 303 recognises, in step 405, different segment types from each other.

If the current segment is not the ODS, then in step 407 the current segment is decoded into the composition buffer 305. Thus, the PCS, WDS and PDS are decoded by the graphics processor 303 to the composition buffer 305.

However, if in step 405 it was concluded that the current segment is the ODS, then in step 409, it is contemplated whether the current segment contains a depth map. If this is the case, then in step 411, the depth map is decoded and transferred to the depth map buffer (DMB) 315. If on the other hand the ODS contains a 2D graphics object, then the 2D graphics object is decoded to obtain uncompressed graphics having index colours, and the graphics processor 303 then transfers, in step 413, the uncompressed graphics to the object buffer (OB) 307.

Then in step 415, the data in the composition buffer 305 is transferred to the graphics controller 309. Then based on the information decoded from the PCS and WDS the graphics controller 309 instructs, in step 417, the object buffer 307 (OB) and the graphics plane 311 (GP) to form a graphics display on the graphics plane 311. Equally, the graphics controller 309 instructs the depth map buffer 315 (DMB) and the depth plane 317 (DP) to form a depth display on the depth plane 311. The information provided by the graphics controller 309 comprises, for instance, information related to cropping and positioning the graphics or depth display on the graphics or depth plane. International patent publication WO2005/006747 discloses further details how a graphics display can be obtained.

Next in step 419, the depth display is composited on the depth plane 317 based on the information obtained from the graphics controller 309. Similarly in step 421 a graphics display is composited on the graphics plane 311. The decoder 300 implements a pipelined decoding model such that the graphics displays and the depth displays can be assembled on the graphics plane and on the depth plane, respectively while, at the same time, new graphics data and depth map data are decoded into the object buffer 307 and depth map buffer 317, respectively.

In step 423 the graphics controller 309 instructs the colour cluts 313, 319 to form colour conversions. Then based on these instructions, in step 425, the depth display is transformed to full colour and transparency in the colour clut 319 and in step 427, the graphics display is transformed to full colour and transparency in the colour clut 313.

Then in step 429 the depth display from the colour clut 319 is transformed to the television 105 for overlaying the depth display on the associated video image. Equally, in step 431 the graphics display from the colour clut 313 is transformed to the television 105 for overlaying the graphics display on the associated video image. As a result, the two different data streams from the colour cluts 313, 319 are output separately to the television 105 for overlaying a 3D subtitle to a 3D video. Then the decoding process may start again. When a new ODS arrives at the graphics processor 303, it is then decoded to the object buffer 307 or to the depth map buffer 315 and then a new display can be assembled on the graphics plane 311 or on the depth plane 317.

Figure 5:
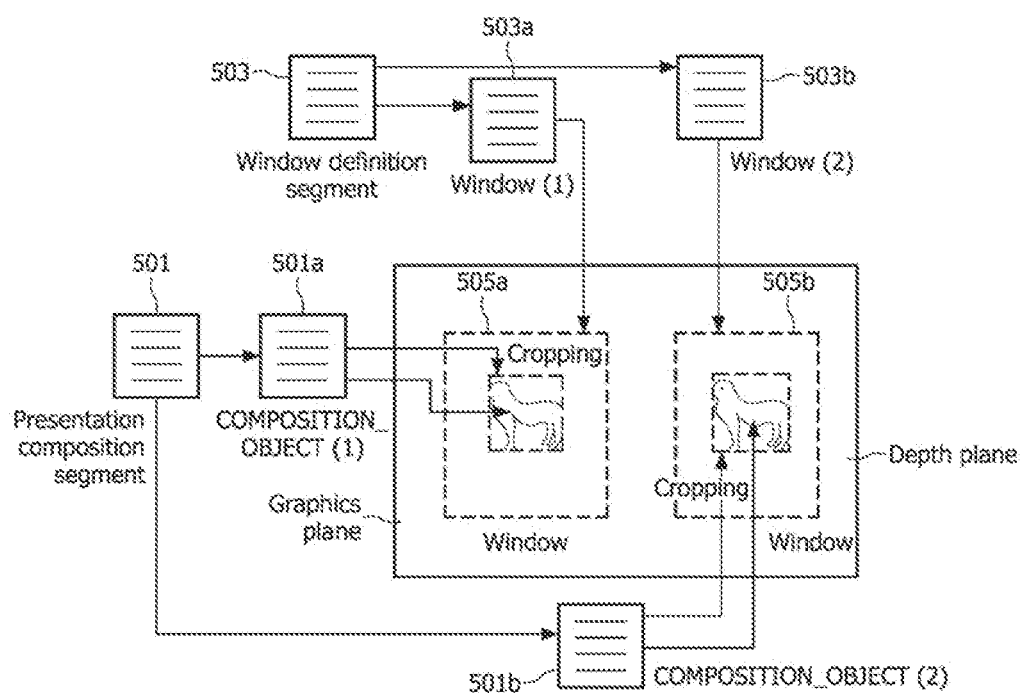
FIG. 5 is a block diagram illustrating a method of creating a graphics stream in accordance with an embodiment of the present invention.

FIG. 5 illustrates the data contained on the graphics plane 311 and on the depth plane 317. In FIG. 5, there is shown one PCS comprising, in addition to other fields, two composition_object fields, namely a composition_object(1) 501a and a composition_object(2) 501b. The composition_object(1) 501a comprises information for cropping the graphics object and positioning the graphics object on the graphics plane 311. Equally, the composition_object(2) 501b comprises information for cropping the depth map and positioning the depth map on the depth plane 317.

In FIG. 5 there is also shown one WDS 503 defining two windows, namely a window(1) 503a and a window(2) 503b. In this case the window(1) 503a defines the window for the 2D graphics object and the window(2) 503b defines the window for the depth map information. The window(1) 503a and the window(2) 503b comprise information on how to define an area, known as a window 505a, 505b, on the graphics plane 311 or on the depth plane 317. In this case a rectangular window is defined by the window(1) 503a and the window(2) 503b. The window(1) 503a and the window(2) 503b define the vertical and horizontal positions of the windows 505a, 505b on the graphics and depth planes as well as the height and width of the windows 505a, 505b. In this case the windows 505a and 505b are of the equal size, but this does not have to be the case. If the windows 505a and 505b are defined to be of different size, then the larger window may contain some padding bits.

The invention equally relates to a computer program product that is able to implement any of the method steps of the embodiments of the invention when loaded and run on computer means of the graphics system.

The invention equally relates to an integrated circuit that is arranged to perform any of the method steps in accordance with the embodiments of the invention.

The invention equally relates to a recording media that is able to implement any of the method steps of the embodiments of the invention when loaded and run on computer means of the recording media.

The invention equally relates to a set-top box that comprises the decoder 300.

The invention equally relates to a DVD player that comprises the decoder 300.

The invention equally relates to a digital television 105 that comprises the decoder 300.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used.

A computer program may be stored/distributed on a suitable medium supplied together with or as a part of other hardware, but may also be distributed in other forms, such as via the Internet or other wired or wireless telecommunication systems. Any reference signs in the claims should not be construed as limiting the scope of the invention.

The invention claimed is:

1. A method in a graphics system for decoding a data stream, wherein the data stream comprises at least first and second segments, the first segment comprising two-dimensional graphics data and the second segment comprising information relating to the two-dimensional graphics data, the method, operable in a processor within the graphics system, comprising:
    receiving the data stream, comprising a window definition segment, a presentation composition segment and a palette definition segment;
    forming a first decoded data sequence from the first segment on a first plane, said first decoded data sequence being cropped and positioned on the first plane within a first area in a first window, and a second decoded data sequence from the second segment on a second plane, said second decoded data sequence being cropped and positioned on the second plane within a first area in a second window;
    color converting said first and second decoded data sequences separately; and
    outputting, separately, the first color-converted decoded data sequence and the second color-converted decoded data sequence to a display unit for rendering a three-dimensional graphics data by combining the first color-converted decoded data sequence and the second color-converted decoded data sequence, wherein the second segment comprises one of: a depth map and an audio data for the two-dimensional graphics data.

2. The method according to claim 1, comprising:
    transferring the first data sequence to a first memory through a first buffer; and
    transferring the second data sequence to a second memory through a second buffer.

3. The method according to claim 1, comprising:
    decoding the window definition segment, the presentation composition segment and the palette definition segment in a third buffer.

4. A computer program product stored on a non-transitory medium, the program when loaded and run on a computer causes the computer to execute the acts of:
    receiving a data stream comprising a window definition segment, a presentation composition segment and a palette definition segment;
    forming:
        a first decoded data sequence from a first segment of said data stream on a first plane, said first decoded data sequence being cropped and positioned on the first plane within a first area in a first window, said first segment comprising two-dimensional graphics objects; and
        a second decoded data sequence from a second segment of said data stream on a second plane, said second decoded data sequence being cropped and positioned on the second plane within a first area in a second window, wherein the second segment comprises one of: a depth map and an audio data for the two-dimensional graphics objects;
    color converting said first and second decoded data sequences, separately, and
    outputting, separately, the first color-converted decoded data sequence and the second color-converted decoded data sequence to a display unit for rendering a three-dimensional graphics data by combining the first color-converted decoded data sequence and the second color-converted decoded data sequence.

5. A recording media having instructions stored therein, which when loaded and run on computer means causes the computer means to execute the acts of:
    receiving a data stream comprising a window definition segment, a presentation composition segment and a palette definition segment;
    forming a first decoded data sequence from the first segment of the data stream on a first plane, said first decoded data sequence being cropped and positioned on the first plane within a first area in a first window, and a second decoded data sequence from the second segment of the data stream on a second plane, said first decoded data sequence being cropped and positioned on the second plane within a first area in a second window, wherein the second segment comprises one of: a depth map and an audio data for the two-dimensional graphics object in the first segment;
    color converting said first and second data sequences separately, and
    outputting, separately, the first color-converted decoded data sequence and the second decoded data sequence to a display unit for rendering a three-dimensional graphics data by combining the first color-converted decoded data sequence and the second color-converted decoded data sequence.

6. A decoder for decoding a data stream, wherein the data stream comprises at least first and second segments, the first segment comprising two-dimensional graphics object and the second segment comprising information related to the two-dimensional graphics object, the decoder comprising:
    a receiver receiving the data stream;
    a processor:
        forming a first decoded data sequence from the first segment on a first plane and forming a second decoded data sequence from a second segment on a second plane;
        color converting said first and second data sequences, separately; and
        outputting the first color-converted decoded data sequence and the second color-converted decoded data sequence separately rendering a three-dimensional graphics data by combining the first color-converted decoded data sequence and the second color-converted decoded data sequence, wherein the second segment comprises one of: a depth map and an audio data for the two-dimensional graphics object.

7. A set-top box comprising:
a decoder comprising:
- a receiver for receiving a data stream;
- a processor:
  - forming a first decoded data sequence from a first segment of said data stream and forming a second decoded data sequence from a second segment of said data stream, wherein the second segment comprises one of: a depth map and an audio data for the two-dimensional graphics object associated with a corresponding first segment;
  - color converting the first decoded sequence and the second decoded sequence, separately; and
  - outputting the first color-converted decoded data sequence and the second color-converted decoded data sequence separately;
- a display unit for rendering a three-dimensional graphics data by combining the first color-converted decoded data sequence and the second color-converted decoded data sequence.

8. A DVD player comprising:
a decoder comprising:
- a receiver for receiving a data stream;
- a processor:
  - forming a first decoded data sequence from a first segment of the data stream and forming a second decoded data sequence from a second segment of the data stream;
  - color converting said first and second data sequences, separately; and
  - outputting the first color-converted decoded data sequence and the second color-converted decoded data sequence, separately,
- wherein the second segment comprises one of: a depth map and an audio data for two-dimensional graphics object associated with the first segment.

9. A digital television comprising:
a decoder comprising:
- a receiver for receiving a data stream;
- a processor:
  - forming a first decoded data sequence from a first segment of said data stream and forming a second decoded data sequence from a second segment of a data stream, wherein the second segment comprises one of: a depth map and an audio data for a two-dimensional graphics object of the first segment;
  - color converting said first data sequence and said second data sequence, separately; and
  - outputting the first color-converted decoded data sequence and the color-converted second decoded data sequence separately; and
- a display unit for rendering a three-dimensional graphics data by combining the first color-converted decoded data sequence and the second color-converted decoded data sequence.

10. A three-dimensional video system for decoding a data stream comprising a video stream of a three-dimensional video, wherein the data stream comprises a graphics data stream, the graphics data stream comprising at least first and second segments and windows definition segments, presentation composition segments and palette definition segments, wherein the first segment comprises two-dimensional graphics data and the second segment comprises information relating to the two-dimensional graphics object, the system comprising:
- a display unit;
- a first buffer,
- a second buffer,
- a first memory,
- a second memory, and
- a processor:
  - receiving the data stream;
  - forming a first decoded data sequence from the first segment, by composing the two-dimensional graphics data from the first segment on a first plane using a first composition object from a presentation composition segment, the first composition object comprising information for cropping and positioning the first segment on the first plane within a first area in a first window, the first window defined by a window definition segment, and color converting the composed first segment using information from a palette definition segment; and
  - forming a second decoded data sequence from the second segment, by composing second graphics data from the second segment on a second plane using a second composition object from a presentation composition segment, the second presentation composition object comprising information for cropping and positioning the second segment on the second plane within a first area within a second window, the second window defined by a window definition segment, and color converting the composed second segment using information from a palette definition segment; and
  - outputting the first decoded data sequence and the second decoded data sequence to the display unit for rendering a three-dimensional graphics data by combining the first decoded data sequence and the second decoded data sequence.

11. The system according to claim 10, wherein the processor:
- transferring the first data sequence to the first memory through the first buffer; and
- transferring the second data sequence to the second memory through the second buffer.

12. The system according to claim 10, further comprising:
a third buffer, wherein the processor:
- decoding the window definition segment, the presentation composition segment and the palette definition segment in the third buffer.

13. A computer program product stored on a non-transitory medium, said program product comprising instructions when loaded and run on computer means causes the computer means to execute the steps of:
- receiving a data stream;
- forming a first decoded data sequence from a first segment, by composing a two-dimensional graphics data from a first segment on a first plane using a first composition object from a presentation composition segment, the first composition object comprising information for cropping and positioning the first segment on the first plane within a first area in a first window, the first window defined by a window definition segment, and color converting the composed first segment using information from a palette definition segment; and
- forming a second decoded data sequence from a second segment, by composing second graphics data from the second segment on a second plane using a second composition object from a presentation composition segment, the second presentation composition object comprising information for cropping and positioning the second segment on the second plane within a first area within a second window, the second window defined by a window definition segment, and color converting the composed second segment using information from a palette definition segment; and outputting the first decoded data sequence and the second decoded data sequence for rendering a three-dimensional graphics data by combining the first decoded data sequence and the second decoded data sequence.

14. A non-transitory recording media having instructions stored thereon, which when loaded and run on a computer means causes the computer means to execute the acts of:

receiving a data stream;

forming a first decoded data sequence from a first segment, by composing a two-dimensional graphics data from a first segment on a first plane using a first composition object from a presentation composition segment, the first composition object comprising information for cropping and positioning the first segment on the first plane within a first area in a first window, the first window defined by a window definition segment, and color converting the composed first segment using information from a palette definition segment; and forming a second decoded data sequence from a second segment, by composing second graphics data from the second segment on a second plane using a second composition object from a presentation composition segment, the second presentation composition object comprising information for cropping and positioning the second segment on the second plane within a second area within a second window, the second window defined by a window definition segment, and color converting the composed second segment using information from a palette definition segment; and outputting the first decoded data sequence and the second decoded data sequence for rendering a three-dimensional graphics data by combining the first decoded data sequence and the second decoded data sequence.

15. A decoder for decoding a data stream comprising a video stream of a three-dimensional video, wherein the data stream comprises a graphics data stream, the graphics data stream comprising at least a first segment and a second segment, window definition segments, picture compositing segments and palette definition segments, wherein the first segment comprising two-dimensional graphics object and the second segment comprising information related to the two-dimensional graphics object, the decoder comprising:

a receiver for receiving the data stream;

a processor:

forming a first decoded data sequence from the first segment, by composing the two-dimensional graphics data from the first segment on a first plane using a first composition object from a presentation composition segment, the first composition object comprising information for cropping and positioning the first segment on the first plane within a first area in a first window, the first window defined by a window definition segment, and color converting the composited first segment using information from a palette definition segment; and forming a second decoded data sequence from the second segment, by composing second graphics data from the second segment on a second plane using a second composition object from a presentation composition segment, the second presentation composition object comprising information for cropping and positioning the second segment on the second plane within a second window, the second window defined by a window definition segment, and color converting the composited second segment using information from a palette definition segment;

combining the first decoded data sequence and the second decoded data sequence; and outputting the combined first decoded data sequence and second decoded data sequence.

16. A set-top box comprising:
a decoder in accordance with claim 15.

17. A DVD player comprising:
a decoder in accordance with claim 15.

18. A digital television comprising:
a decoder in accordance with claim 15; and
a display unit for rendering a three-dimensional graphics data by combining the first color-converted decoded data sequence and the second color-converted decoded data sequence.

19. A method in a three-dimensional video system for decoding a data stream comprising a video stream of a three-dimensional video, wherein the data stream comprises a graphics data stream, the graphics data stream comprising at least first and second segments and windows definition segments, presentation composition segments and palette definition segments, wherein the first segment comprising two-dimensional graphics data and the second segment comprising information relating to the two-dimensional graphics object, the method comprising:

receiving the data stream;

forming a first decoded data sequence from the first segment, by compositing the two-dimensional graphics data from the first segment on a first plane using a first composition object from a presentation composition segment, the first composition object comprising information for cropping and positioning the first segment on the first plane within a first area in a first window, the first window defined by a window definition segment, and color converting the composited first segment using information from a palette definition segment and forming a second decoded data sequence from the second segment, by compositing second graphics data from the second segment on a second plane using a second composition object from a presentation composition segment, the second presentation composition object comprising information for cropping and positioning the second segment on the second plane within a second area within a second window, the second window defined by a window definition segment, and color converting the composited second segment using information from a palette definition segment; and outputting the first decoded data sequence and the second decoded data sequence to a display unit for rendering a three-dimensional graphics data by combining the first decoded data sequence and the second decoded data sequence.

20. The method according to claim 19, wherein the three-dimensional video system comprises a processor, a first buffer, a second buffer, a first memory and a second memory, the method further comprising:

transferring the first data sequence from the processor to the first memory through the first buffer; and transferring the second data sequence from the processor to the second memory through the second buffer.

21. The method according to claim 19, wherein the three-dimensional video system further comprising a third buffer, the method further comprises:

decoding the window definition segment, the presentation composition segment and the palette definition segment to the third buffer by the processor.

* * * * *